No. 897,916. PATENTED SEPT. 8, 1908.
H. A. MYERS.
HIGH SPEED ROTARY DEVICE.
APPLICATION FILED JAN. 21, 1907.

2 SHEETS—SHEET 1.

Witnesses:
G. V. Douams
Robert H. Weir

Inventor:
Hubert H. Myers.
By Buckley, Durand & Drury
attys

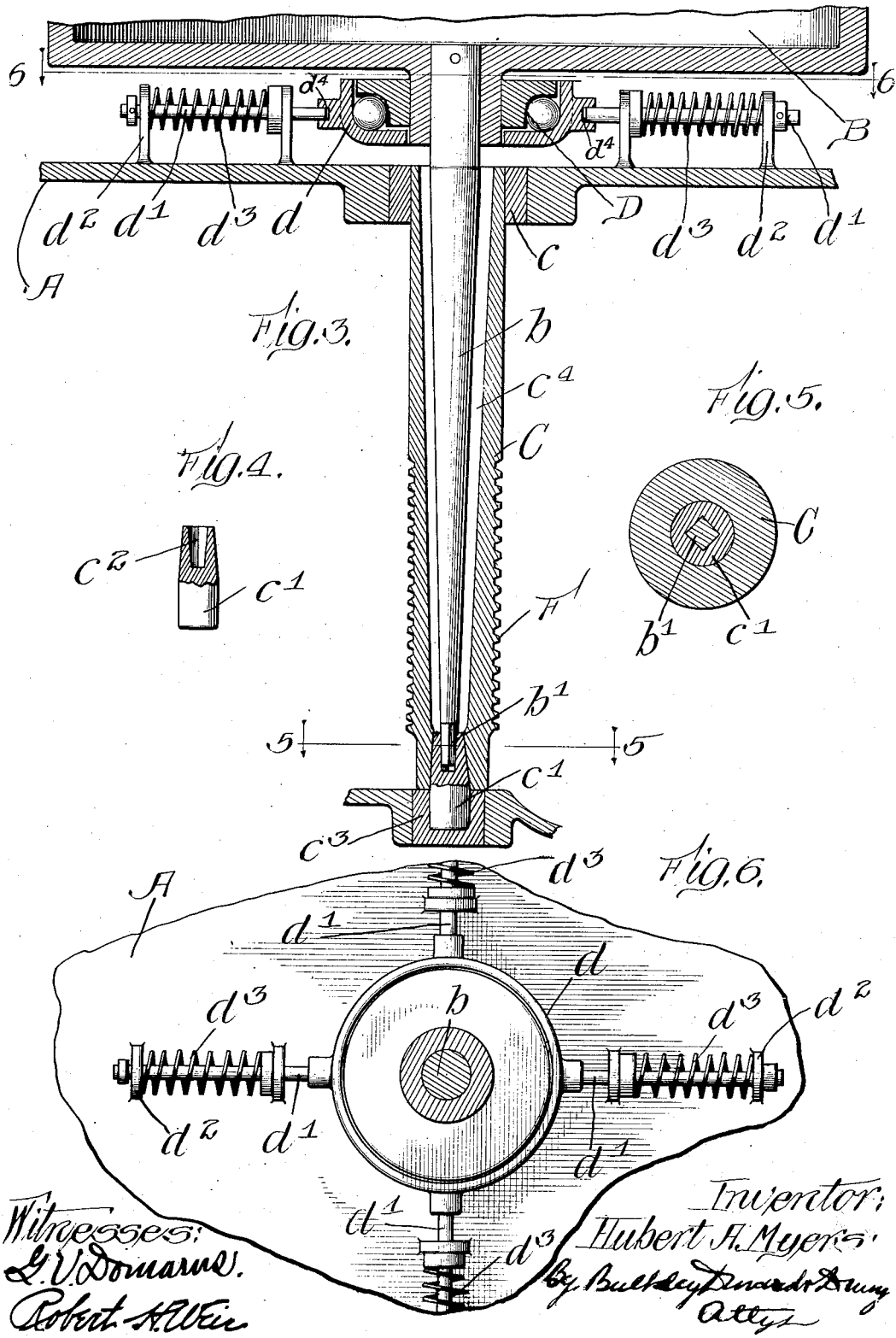

UNITED STATES PATENT OFFICE.

HUBERT A. MYERS, OF GOSHEN, INDIANA.

HIGH-SPEED ROTARY DEVICE.

No. 897,916.    Specification of Letters Patent.    Patented Sept. 8, 1908.

Application filed January 21, 1907. Serial No. 353,204.

*To all whom it may concern:*

Be it known that I, HUBERT A. MYERS, a citizen of the United States of America, and resident of Goshen, Elkhart county, Indiana, have invented a certain new and useful Improvement in High-Speed Rotary Devices, of which the following is a specification.

My invention relates to cream separators, and contemplates a rotary self-balancing bowl—that is to say, a bowl that is mounted for slight lateral movement sufficient to enable it to find its true vertical axis of rotation, at least a portion of such lateral movement being entirely free and unopposed, so that if springs are used for the upper bearing of the spindle of the bowl, such springs will not oppose the slight lateral play or movement of the bowl, or at least will not oppose all of such movement, whereby the bowl is capable of rotating in a condition absolutely free from external unbalancing influences, such as might be due to spring pressed bearings or power transmitting connections, as will hereinafter more fully appear.

Heretofore the balancing of a cream separator bowl has been a matter of some difficulty, and has always been more or less of a problem in the manufacture and use of cream separators of this particular type. With my improved arrangement, however, involving a bowl which has a slight or limited amount of lateral movement free from opposition or lateral thrust, the bowl is absolutely self-balancing, and is free to readily find its true vertical axis of rotation, regardless of inequalities in the distribution of the weight thereof, as will hereinafter more fully appear.

To the foregoing and other useful ends, my invention consists in matters hereinafter set forth and claimed.

Figure 1:
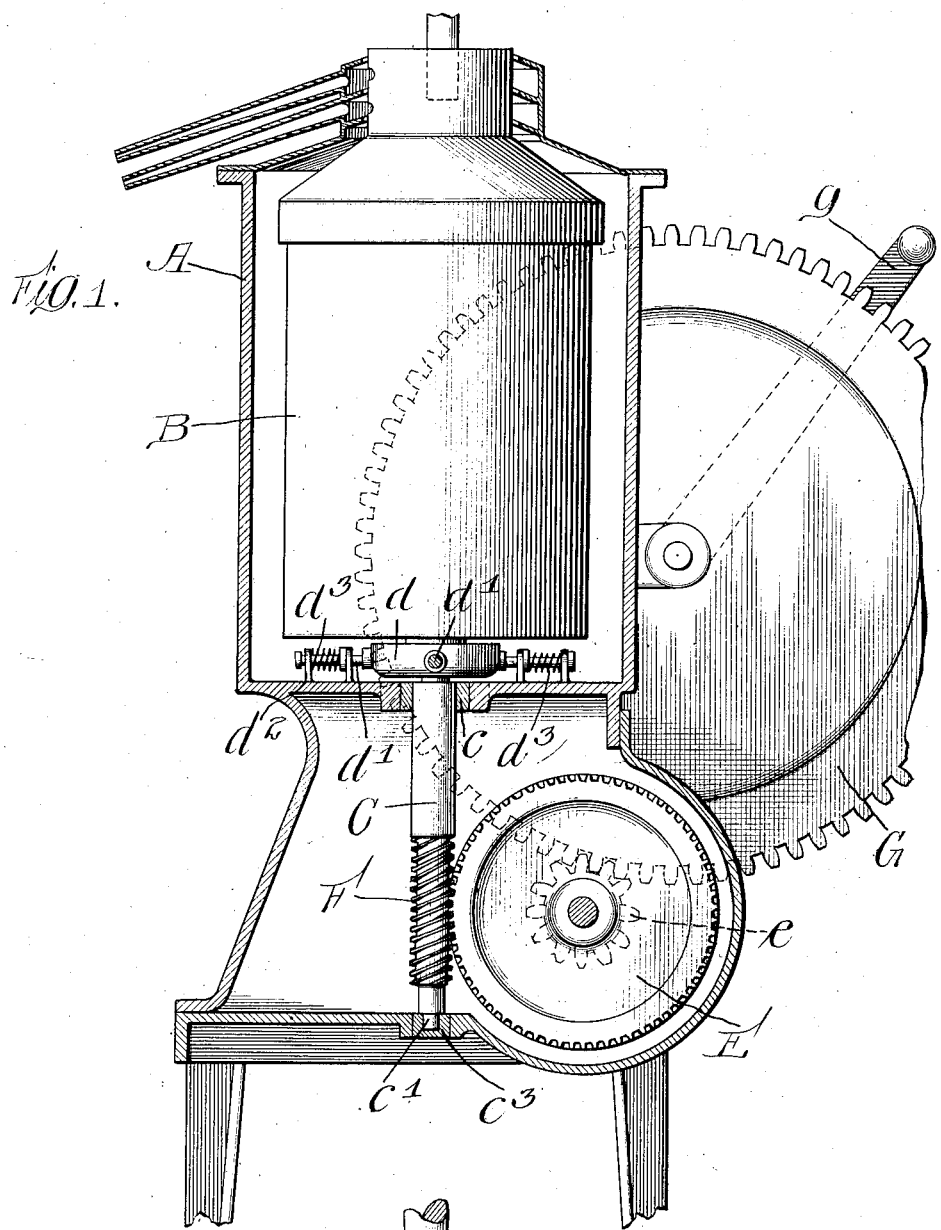
Figure 2:
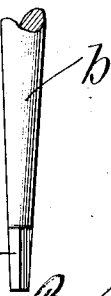

In the accompanying drawings Figure 1 is a sectional side elevation of a cream separator embodying the principles of my invention. Fig. 2 is an enlarged detail view of the apex or lower end of the inner spindle of the bowl of the said separator. Fig. 3 is an enlarged sectional view of the bearings and spindles by which the bowl is separated for free and self-centering rotation. Fig. 4 is a detail sectional view of the tool-steel center pin by which the two spindles of the bowl are supported. Fig. 5 is an enlarged cross section on line 5—5 in Fig. 3. Fig. 6 is a cross section on line 6—6 in Fig. 3.

As thus illustrated, my invention comprises a casing or body A of any suitable form or construction and adapted to inclose a rotary upright bowl B. It will be understood, of course, that the skimming or separating devices within the bowl may be made of any suitable known or approved character. The said bowl is provided at its lower end with a spindle $b$ having a tapered and squared apex or lower end portion $b^1$. The outer or inclosing spindle C has its upper end held in a bearing $c$, and its lower end provided with a tool-steel center pin $c^1$, the latter having a socket $c^2$ adapted to receive the spindle portion $b^1$, as shown in Fig. 3. This center pin $c^1$ is suitably secured to the spindle C, and supported in a thrust bearing $c^3$, whereby the said outer spindle C is securely held against lateral movement and supported against downward thrust. It will be seen that the diameter of the inner spindle $b$ is less than the diameter of the bore $c^4$ of the outer spindle, thus insuring sufficient relative movement or play between the two spindles to permit the rotary bowl to center itself during rotation. It will be understood that the engagement of the portions $c^1$ and $b^1$ is just loose enough to permit lateral play or movement of the spindle $b$. In order to support the bowl in an approximately vertical position, and in as nearly a centered condition as possible when starting the rotation thereof, the bottom of the bowl is provided with a ball bearing D which does not sustain any of the weight of the bowl, but which will sustain any lateral thrust of the bowl when it starts rotating, and while the speed is being increased to a point where it will find its own center and acquire a self-sustaining rotation, much as a top sustains itself in an upright position upon its peg or apex. This ball bearing has the cup or outer portion $d$ thereof supported upon horizontally disposed rods $d^1$, which are supported in suitable bearings $d^2$, arranged at intervals around the spindle of the bowl. The springs $d^3$ which are suitably applied to said rods tend to yieldingly hold the ball bearing in a central position, and are adapted to yield readily to any slight lateral thrust or wabbling movement which may characterize the initial rotation of the bowl, owing to some more or less serious unbalancing thereof, such as might result from an uneven or non-uniform distribution of the metal from which the bowl and its part are made. The said ball bearing is, however, preferably so constructed that it only receives the lateral thrust of the bowl during the initial rotation thereof, the parts being sufficiently loosely fitted together to enable the bowl to quickly center itself and practically draw away from the means thus provided for holding it in an approximately vertical position while at rest or while starting to rotate. In this way the bowl is supported for free and self-centering rotation upon its lower end or apex, and, consequently, delicate balancing of the bowl is unnecessary as it is practically self-balancing and adapted to automatically adjust itself to find the true center or axis of rotation. One side of the bowl can be somewhat heavier than the other, and still the bowl will readily center itself and rotate freely and smoothly and without lateral strain on any of the bearings, and without causing objectionable friction. The outer spindle C is subject to no lateral strain whatever, as it is sufficiently roomy inside to permit the inner spindle to shift one way or the other to find the natural or true center of rotation.

Preferably, the spindle C is rotated by means of a worm-wheel E adapted to engage the worm F formed upon the outer surface of the lower end portion of the said spindle. The worm-wheel E is rigidly connected with a pinion $e$, and this pinion is adapted to engage the teeth of a large gear wheel G, which latter is rotated by a crank $g$. In this way the speed of the crank is rapidly multiplied or increased, and by the time the power thus transmitted reaches the spindle of the bowl the speed has become relatively high, at least sufficient to accomplish the separation of the cream from the milk within the bowl. With a worm gear transmission of this character the self-centering rotation of the bowl is very important, as it leaves the worm F free from all lateral strain or undue friction, such as would result from unbalancing the bowl and insures a free and smooth meshing of the teeth thereof during rotation of the bowl. In this way I provide a cream separator having provisions for rotating the bowl at a high rate of speed without danger of breakage or undue friction or binding of the different parts, such as might result from an unbalancing of the bowl. Being left free for self-centering rotation, the bowl requires no delicate balancing or adjustment and will always rotate freely and quietly and easily.

It will be seen that the self-balancing bowl with which I thus provide a cream separator is adapted to center or balance itself upon the lower end of its spindle, which lower end of the spindle rests on a rotating member. As illustrated and described, this rotating member has another spindle whereby the bowl is practically provided with two spindles, one a rigid or bowl-spindle, and the other a power-spindle. The power-spindle is mounted in bearings, and means are provided for communicating motion to the power-spindle to rotate the bowl. Means are also provided for communicating the rotary motion from the power-spindle to the bowl-spindle, for the specified purpose. The lower end of the bowl-spindle, of course, rests loosely on the power-spindle—that is to say, loosely enough to permit the bowl to move laterally to find its center of rotation. In this way the power is communicated to the member upon which the bowl-spindle rests, and the said bowl is left free to balance itself on the lower end of its spindle.

It is evident that I provide a spindle $b$ which is free from lateral thrust thereon, inasmuch as the communication of power thereto is balanced. By this I mean that the power transmitting devices do not subject the said spindle $b$ to any lateral thrust, and consequently said spindle is always free to move laterally to find the true axis of rotation. Such lateral movement is not even opposed by the springs $d^3$, for these springs, as previously explained, only act during the initial rotation of the bowl, there being slight play or lost motion (as indicated at $d^4$) between $d$ and $d^1$, which gives the spindle $d$ free lateral motion within limits. In other words, after the bowl has once attained a self-sustaining speed of rotation, any slight lateral movement which it may then require is not opposed by the said springs. In this way, the bowl by rotating at high speed is subject to no lateral thrust or external unbalancing influences, such, for example, as would be the case when the spindle is subject to a direct lateral thrust by some form of power transmission gearing, or were the spindle held tightly for rotation in ordinary bearings. The worm gearing constitutes the power transmitting devices, and the connection between the worm gearing and the spindle constitutes means for equalizing or balancing the transmission of power to the spindle $b$—that is to say, for so communicating the power to said spindle that the latter is subject to no lateral thrust thereby. With this arrangement, the bowl seeks its own true center or axis of rotation unobstructed by any unbalancing influences exerted either by bearings or power transmitting devices. At the same time, it will be seen that power is communicated to the spindle through or by way of the member upon which the lower end of the same rests, so that both the spindle and its support are caused to rotate. In this way the spindle is devoid of any power transmitting connections which would tend to exert a lateral thrust upon it, or to oppose its lateral movements, at any point above its lower end or point of support. So that in stating that the spindle $b$ is free from lateral thrust by the transmission of power thereto, I mean that the same is not subject to lateral thrust and does not have its free lateral movement in any way opposed by the power transmission at any point above its lower end or portion where it more or less loosely connects with the rotary member upon which it rests and by which it is rotated.

While I have embodied my invention in a cream separator, it will be seen that the self-balancing feature can be employed for other kinds of machinery, such as may have high speed rotary devices other than bowls, and that in the following claims I do not limit myself to a machine for this purpose, except where so specified.

It will be understood, of course, that I do not limit myself to the exact construction shown and described, except as expressly stated in the claims as follows:

What I claim as my invention is:

1. A machine for the purpose specified, having a rotary driven centrifugal member, a spindle supported for free and unopposed lateral movement, within limits, and self-centering rotation upon its lower end, and means for supporting the spindle against endwise movement.

2. A machine for the purpose specified, having a rotary driven centrifugal member, provided at its bottom with a downwardly extending spindle which is free from lateral thrust, within limits, and supported for self-centering rotation, means for communicating power to the lower end of said spindle and supporting the same against endwise movement.

3. A machine for the purpose specified, having a rotary driven centrifugal member, a rotary and downwardly extending spindle supported for free and self-centering rotation, an outer spindle in which the said first mentioned spindle is inclosed, with sufficient space between the two spindles to permit the inner spindle to find its center of rotation, bearings for the upper and lower ends of said outer spindle, and means for communicating power to the outer spindle to rotate the said member.

4. A machine for the purpose specified, having a rotary driven centrifugal member, a rotary spindle supported for lateral movement and self-centering rotation, means at the upper end of the spindle for steadying and supporting the same in an approximately vertical and central position while at rest, or while starting to rotate, permitting unopposed lateral movement of the spindle within limits, and means for supporting and communicating power to the lower end of said spindle to rotate said member.

5. A machine for the purpose specified, having a rotary driven centrifugal member, an upright rotary spindle extending downwardly from the bottom of said member, means for supporting said spindle for lateral movement, within limits, and self-centering rotation, a worm gearing for communicating power to said supporting means to rotate said spindle, means for operating said worm gearing to rotate the said spindle, and means for holding the spindle against endwise vertical displacement.

6. In a cream separator, an upright rotary member which is movable sidewise free from lateral thrust, within limits, and supported at its lower end for self-centering rotation about a vertical axis, and a rotatable support on which the lower end of said member rests with sufficient looseness to permit its upper end to move laterally.

7. In a cream separator, a self-centering rotary device which is movable sidewise free from lateral thrust, within limits, and supported at its lower end, a rotary member on which the lower end of said device rests with sufficient looseness to permit its upper end to move laterally, and means for communicating motion to said rotary member to rotate the said device.

8. In a cream separator, an upright device which is movable sidewise free from lateral thrust, within limits, and supported for self-centering rotation about a vertical axis, a rotary member by which the device is supported, and means for communicating motion to said member to rotate the said device.

9. In a cream separator having a rotary driven centrifugal member, a rotary driven spindle for said member, a power spindle provided with means on which the lower end of said driven spindle rests, and means for rotating the power spindle to communicate the motion therefrom to the driven spindle; said driven spindle being free to move sidewise unopposed, within limits, to balance itself on the lower end thereof.

10. A machine for the purpose specified, having a rotary driven centrifugal member, a rotary driven spindle therefor, a rotary supporting member on which the lower end of said spindle is supported, and means for rotating said member, there being provisions for communicating the rotary motion from the supporting member to the spindle, and said driven spindle being movable sidewise free from lateral thrust, within limits, and thereby adapted to balance itself on the lower end thereof.

11. A machine for the purpose specified, having a rotary driven centrifugal member, a rotary driven spindle therefor, the said driven spindle being free to balance itself on the lower end thereof, and having a limited free lateral play or unopposed movement, a power spindle provided with means on which the lower end of the driven spindle is supported, bearings for said power spindle, and means for rotating the power spindle at high speed to rotate the driven spindle.

12. A rotary centrifugal member, a spindle therefor mounted for rotation and slight lateral movement sufficient to enable the member to find the true vertical axis of rotation, means applied to the lower end of the spindle to so rotate the same that the said member is balanced, and a spring pressed bearing for the upper end of said spindle, said bearing being adjusted to permit the spindle to have a limited lateral movement free from opposition by the springs thereof.

13. A rotary centrifugal member, a spindle therefor mounted for rotation and slight lateral movement sufficient to enable the member to find the true vertical axis of rotation, means applied to the lower end of the spindle for so rotating the same that the said member is balanced, and spring means for normally holding the spindle in a substantially upright position, said spring means being adjusted to permit the spindle to have a limited lateral movement or play free from spring resistance or opposition thereto.

14. A rotary centrifugal member, a spindle therefor mounted for rotation and slight lateral movement sufficient to enable the member to find the true vertical axis of rotation, but held against endwise movement, a portion of said lateral movement being free and unopposed, and means for effecting such a transmission of power to said spindle that the said member is balanced, said member thereby being free from lateral thrust by the transmission of power thereto.

15. A rotary centrifugal member, a spindle therefor mounted for rotation and slight lateral movement sufficient to enable the member to find the true vertical axis of rotation, but held against endwise movement, a portion of said lateral movement being free and unopposed, mechanical power transmitting devices, and means for so communicating power to said spindle that the said member is balanced, said member thereby being free from lateral thrust by the transmission of power thereto.

Signed by me at Chicago, Illinois, this 19th day of January, 1907.

HUBERT A. MYERS.

Witnesses:
S. LEWIS,
ALBERT JOHN SAUSER.